(12) United States Patent
Bruns

(10) Patent No.: US 7,460,294 B2
(45) Date of Patent: Dec. 2, 2008

(54) OPTICALLY ADDRESSED MEMS

(75) Inventor: Donald Bruns, San Diego, CA (US)

(73) Assignee: Trex Enterprises Corp, San Diego, CA (US)

( * ) Notice: Subject to any disclaimer, the term of this patent is extended or adjusted under 35 U.S.C. 154(b) by 0 days.

(21) Appl. No.: 11/717,373

(22) Filed: Mar. 12, 2007

(65) Prior Publication Data

US 2008/0031569 A1 Feb. 7, 2008

Related U.S. Application Data

(62) Division of application No. 10/045,459, filed on Nov. 7, 2001, now Pat. No. 7,190,509.

(51) Int. Cl.
*G02F 1/29* (2006.01)
*G02B 6/06* (2006.01)

(52) U.S. Cl. .............................. 359/299; 385/16; 385/18

(58) Field of Classification Search ................. 359/299, 359/290, 291, 292, 295, 298, 220, 223, 224, 359/320, 324; 385/2, 3, 8, 16, 17, 18, 24, 385/31, 32, 39, 40, 901

See application file for complete search history.

(56) References Cited

U.S. PATENT DOCUMENTS

| | | | |
|---|---|---|---|
| 5,912,608 A | 6/1999 | Asada | |
| 5,914,801 A | 6/1999 | Dhuler et al. | |
| 5,920,417 A | 7/1999 | Johnson | |
| 6,075,639 A | 6/2000 | Kino et al. | |
| 6,175,443 B1 | 1/2001 | Aksyuk et al. | |
| 6,201,629 B1 | 3/2001 | McClelland et al. | |
| 6,201,631 B1 | 3/2001 | Greywall | |
| 6,265,239 B1 | 7/2001 | Aksyuk et al. | |
| 6,275,326 B1 | 8/2001 | Bhalla et al. | |
| 7,208,809 B2 * | 4/2007 | Urano et al. | ................ 257/432 |

* cited by examiner

*Primary Examiner*—Ricky L Mack
*Assistant Examiner*—Tuyen Q Tra
(74) *Attorney, Agent, or Firm*—John R. Ross

(57) ABSTRACT

Optically controlled micro-electromechanical systems (MEMS) is disclosed. In one embodiment, a MEMS device may include a rotatable mirror having an optical sensor that is in electrical communication with the rotatable mirror via an associated electrode. Electrical potential may be supplied to an appropriately configured optical sensor so that a variable range of voltages may be supplied to the rotatable mirror. In operation, an optical control beam may be directed onto the optical sensor where it may be sampled to determine its optical characteristics (e.g., optical wavelength, light intensity, position, polarization, duty cycle, etc.) The optical sensor may then supply voltage to the rotatable mirror based on the determined optical characteristics of the optical control beam, causing the rotatable mirror to rotate about one or more axes.

17 Claims, 12 Drawing Sheets

Optical Switch Having an Optically Addressed MEMS Array

Optical Controller Lenslet Array

Exemplary Sensor Voltage Circuits

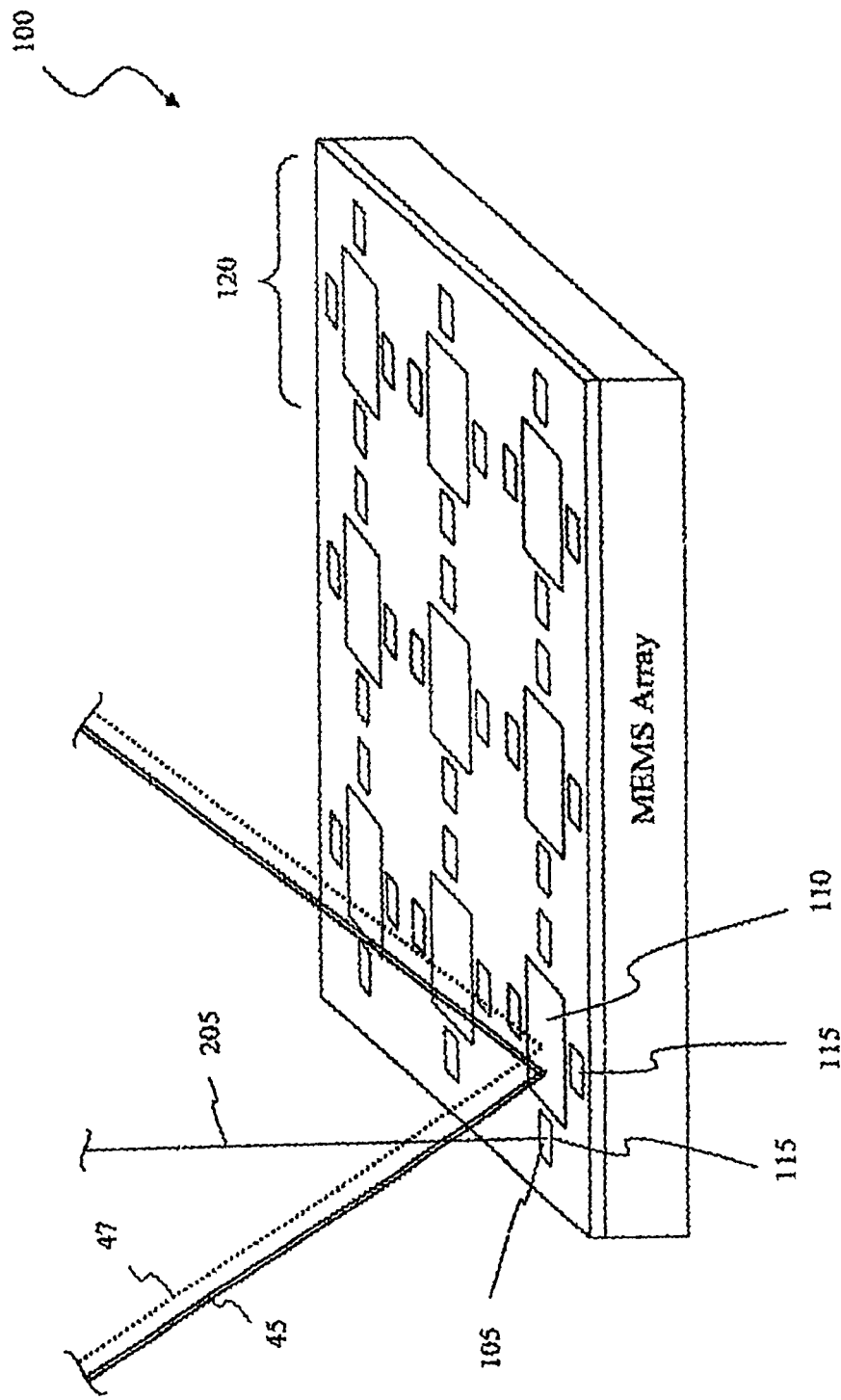

US 7,460,294 B2

OPTICALLY ADDRESSED MEMS

CROSS REFERENCE TO RELATED APPLICATIONS

This is a divisional of application Ser. No. 10/045,459 filed Nov. 7, 2001 scheduled to issue as U.S. Pat. No. 7,190,509 on Mar. 13, 2007.

FIELD OF THE INVENTION

The present invention relates to micro-electromechanical devices and systems (MEMS), and in particular, to an optically controllable MEMS device.

BACKGROUND OF THE INVENTION

Optical devices and systems often employ an array of micro-machined mirrors, each mirror being individually movable in response to an electrical signal. In some systems, each of the mirrors can each be cantilevered and moved by an electrostatic force. In one implementation, mirror arrays can be used as optical cross connects in an optical communication system. Generally, each mirror of the cross-connect device may be addressed by a number of electrical leads. In operation, one or more mirrors may receive a beam of light from, for example, an individual optical fiber in a fiber optic bundle. The beams of light reflected from the mirrors may be individually directed to a pre-specified location (e.g., a particular output fiber within an fiber optic bundle array) by individually moving the appropriate mirrors.

To optimize a device's optical transfer ability, it is typically desirable to densely arrange the individual mirrors. However, closely spacing the mirrors is problematic for a variety of reasons. For example, each mirror typically requires some type of supporting structure which may occupy a considerable amount of space. The required electrical interconnections also limit the mirror density. As the number of mirrors in a MEMS array increases, the number of electrical lead lines also increases and must be crowded into already confined spaces. For example, a 256 count mirror device (16.times.16 array) with four electrical leads per mirror would require 1024 separate electrical interconnections.

The number of mirror arrays that may occupy a particular sized chip is therefore subject to limitations based on the physical limits as to how small the leads can be made and how closely they can be spaced apart from each other. Currently, the number of mirrors that may be fabricated on a device is limited because of the above-described physical limitations.

Attempts to increase the number of mirrors on a MEMS device typically result in either an increase in the size of the MEMS device or a decrease in the size of the individual mirrors. However, larger sized MEMS devices and smaller mirrors are often undesirable in many applications.

In view of the foregoing, a present need exists for an optical device that may include a larger array of mirrors, while not sacrificing the necessary mirror spacing or increasing the overall device size.

The problem of designing or assembling the optical controller is much simplified compared to the MEMS device because there is more area in the optical controller to place wires or control circuitry. The optical controller may be built with multi-layer printed circuit boards, for example, so the controller wires may be easily be laid on top of each other to cross over to the center of the array. Multiplexing circuitry with digital addressing techniques may be used to reduce the number of required control lines in the optical controller, which is not currently possible with the MEMS electrodes. A third technique would be to use a much larger physical area for the optical controller to accommodate the many control wires, and optically reduce the optical control signals to match the MEMS pattern. This may be done using a single large lens to focus the optical control signals to the MEMS detectors, or use flexible fiber optics to carry the optical control signals from a large, remote location to the MEMS detectors.

SUMMARY OF THE INVENTION

The optically addressable micro-electromechanical system (MEMS) of the present invention includes a rotatable mirror having an optical sensor that is in electrical communication with the rotatable mirror via an associated electrode. In one embodiment, electrical potential may be supplied to an appropriately configured optical sensor so that a variable range of voltages may be supplied to the rotatable mirror. In operation, an optical control beam may be directed onto the optical sensor where it may be sampled to determine its optical characteristics. The optical sensor may then supply voltage to the rotatable mirror based on the determined optical characteristics of the optical control beam, causing the rotatable mirror to rotate about one or more axes.

In accordance with one aspect of the present invention, an angle of rotation of the rotatable mirror about one or more axes may be controlled by modifying the optical characteristics (e.g., optical wavelength, light intensity, position, polarization, duty cycle, etc.) of the optical control beam.

In accordance with another aspect of the present invention, the rotatable mirror may be provided with a plurality of optical sensors that are in electrical communication with the rotatable mirror via separate electrodes. In this aspect, a first and second optical sensor of the plurality of optical sensors may enable the rotatable mirror to be rotated about respective primary and secondary axes.

In another aspect of the present invention, the respective angles of rotation of the rotatable mirror may be controlled by modifying the respective optical characteristics of the first and second optical control beams.

In another aspect of the present invention, a plurality of rotatable mirrors may be utilized to form a MEMS array. In this aspect, each of the plurality of rotatable mirrors may include at least one associated optical sensor.

In still another aspect of the present invention, electrical potential is supplied to each of the plurality of optical sensors using a variety of different methods. For example, electrical potential may be supplied to each of the plurality of optical sensors via a common electrical lead. Alternatively, electrical potential may be supplied to each of the plurality of optical sensors via a number of electrical leads, where the number of electrical leads is less than the number of optical sensors or less than the number of rotatable mirrors that form the MEMS array.

In still yet another aspect of the present invention, an optically controlled MEMS device may be used in an optical cross connect switch. In this aspect, the switch may include a fiber optic switch beam generating element that generates a communication light beam, a fiber optic switch beam receiving element that receives the communication light beam from the fiber optic switch beam generating element at one of an array of output fibers. The device may further include a MEMS device for directing the communication light beam from the fiber optic switch beam generating element to a particular output fiber of the beam receiving element. In one configuration, the optical controller controls which particular output fiber that the communication beam is directed to by modifying the optical characteristics of the optical control beam.

BRIEF DESCRIPTION OF THE DRAWINGS

The nature, objects, and advantages of the present invention will become more apparent to those skilled in the art after considering the following detailed description in connection with the accompanying drawings, in which like reference numerals designate like parts throughout, and wherein:

FIG. 11 is a perspective view of control, communication, and alignment beams striking an optically addressed MEMS of the present invention.

DETAILED DESCRIPTION OF A PREFERRED EMBODIMENT

In the following description of a preferred embodiment, reference is made to the accompanying drawings, which form a part hereof, and which show by way of illustration a specific embodiment of the invention. It is to be understood by those of working skill in this technological field that other embodiments may be utilized, and structural as well as procedural changes may be made without departing from the scope of the present invention.

It is to be understood that the optically addressed MEMS of the present invention may be utilized in any of a number of systems that utilize MEMS devices. Optical communication systems is but one type of application that may utilize the MEMS devices of the present invention. For example, optical communication systems often utilize some type of MEMS device in an optical switching mechanism. Generally, these switching mechanisms selectively switch a communication beam from an input fiber to one or more output fibers using a variety of methods. Although reference will be made to particular optical switching systems as well as specific MEMS devices and configurations, it is to be understood that the present invention is not so limited and may be used in a variety of applications where optical control of a MEMS device is desired.

One implementation of the present invention may be used in conjunction with the system disclosed in U.S. patent application Ser. No. 09/1846,879, entitled "OPTICAL CROSS CONNECT SWITCH", filed Apr. 30, 2001, the entire disclosure of which is incorporated herein by reference for all purposes. Again, it is to be understood that the present invention is not limited to any particular system or configuration.

Figure 1:
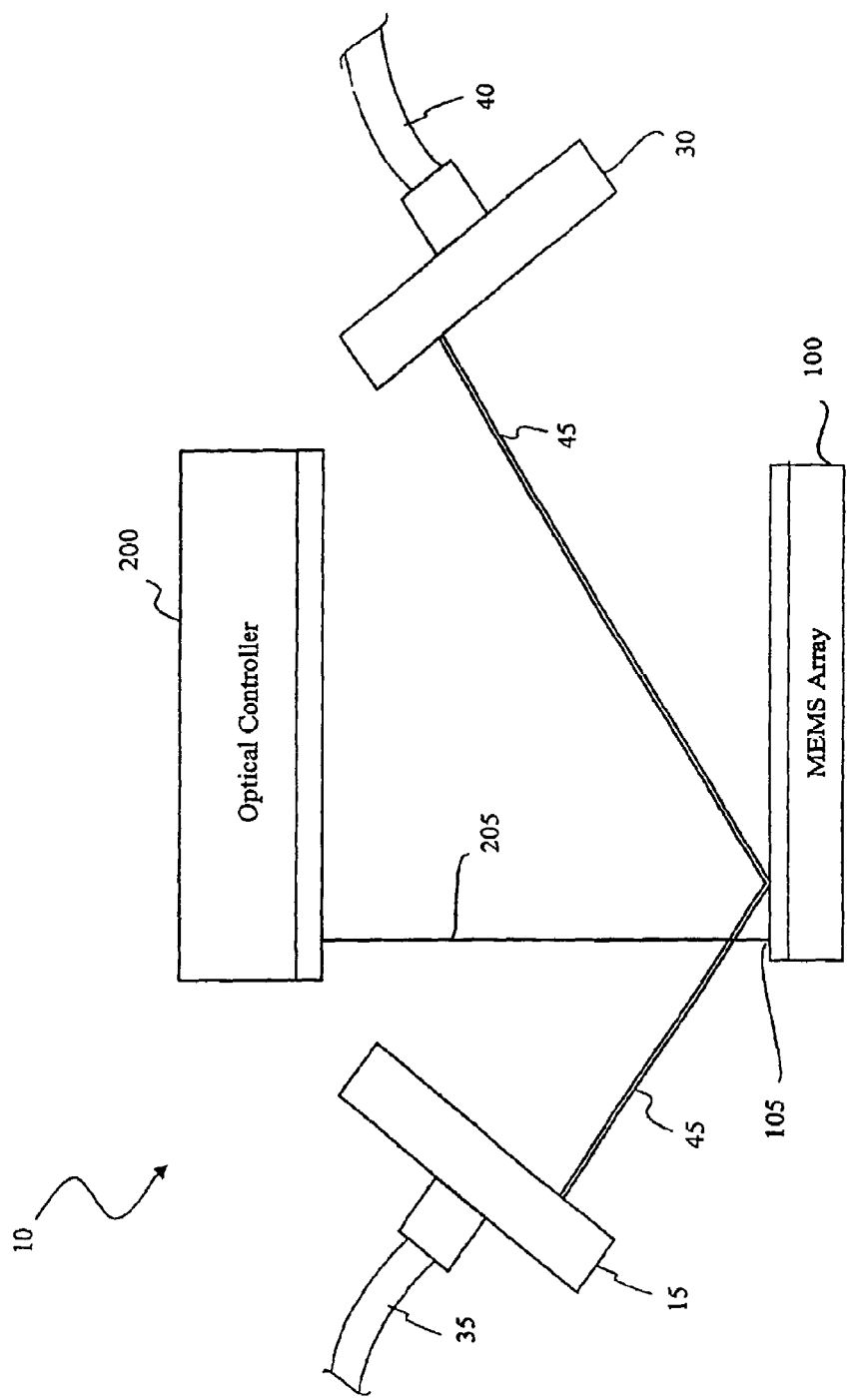
FIG. 1 is a diagram illustrating an exemplary configuration of some of the major components of an optical switch having an optically addressed MEMS array of the present invention.

Referring initially to FIG. 1, an exemplary configuration of an optical cross connect switch utilizing the optically addressed MEMS of the present invention is shown and generally designated 10. As shown in this Figure, switch 10 includes several components, including a beam generating element 15, a MEMS array 100, a beam receiving element 30, as well as an optical controller 200.

In one embodiment, beam generating element 15 generates one or more optical beams In a typical configuration, beam generating element 15 may receive a number of optical fibers 35 as well as having the necessary structure (e.g., optical lenses, etc.) so that an optical beam, such as a fiber optic signal, may be generated.

Similarly, beam receiving element 30 may be configured so that the one or more optical beams generated by the beam generating element 15 can be received. Typically, beam receiving element 30 is configured to receive a number of output fibers 40 and may also include structural elements such as optical lenses, ferrules, and the like.

Referring still to FIG. 1, a communication beam 45 may be generated at the beam generator 15 where it propagates over a distance until it impinges upon MEMS array 100. A control beam 205 is shown being generated at the optical controller 200 and then striking a sensor (not shown in this Figure) on MEMS array 100, at location 105. A reflecting element (not shown in this Figure) within the MEMS array 100 may be positioned so that the communication beam 45 is redirected to an appropriate portion of the beam receiver 30. As will be described in detail herein, the MEMS array 100 utilizes the control beam 205 to control the positioning of the reflecting element so that the communication beam 45 may be appropriately redirected.

Beam generating element 15 represents any of a variety of optical signal generation devices, the specific structure of which is not essential to the present invention. Typically, the beam generating element 15 will comprise a two-dimensional array of fiber optic input fibers and associated collimating lenses (not shown).

Similarly, the beam receiving element 30 may comprise a two-dimensional array of fiber optic output fibers and associated focusing lenses (not shown). Typically, each of the fiber optic output fibers correspond to one or more of the fiber optic input fibers of the beam generating element 15.

MEMS array 100 represents a micro-electromechanical system, which is commonly referred to as a MEMS device. As is known in the art, MEMS devices may be manufactured of silicon using techniques similar to those techniques for manufacturing semiconductor devices. MEMS array 100 may include devices that can vary the orientation of its substantially planar reflective surface by varying the voltages applied to the device. As will be described in detail herein, the present invention may utilize an optical control beam to control and vary the voltage supplied to each individual MEMS device.

Reference will be made to the beam generating and receiving elements 15 and 30, as well as MEMS array 100, as having a 3×3 array configuration. However, the present invention is not so limited. One of ordinary skill in the art will realize that the optically addressed MEMS of the present invention may be utilized in optical switches having beam generating, directing, and receiving elements that are of varying sizes (e.g., 2×2, 4×4, 6×6, 16×16, 20×20, etc.)

Optical Controller and MEMS Array

Figure 2:
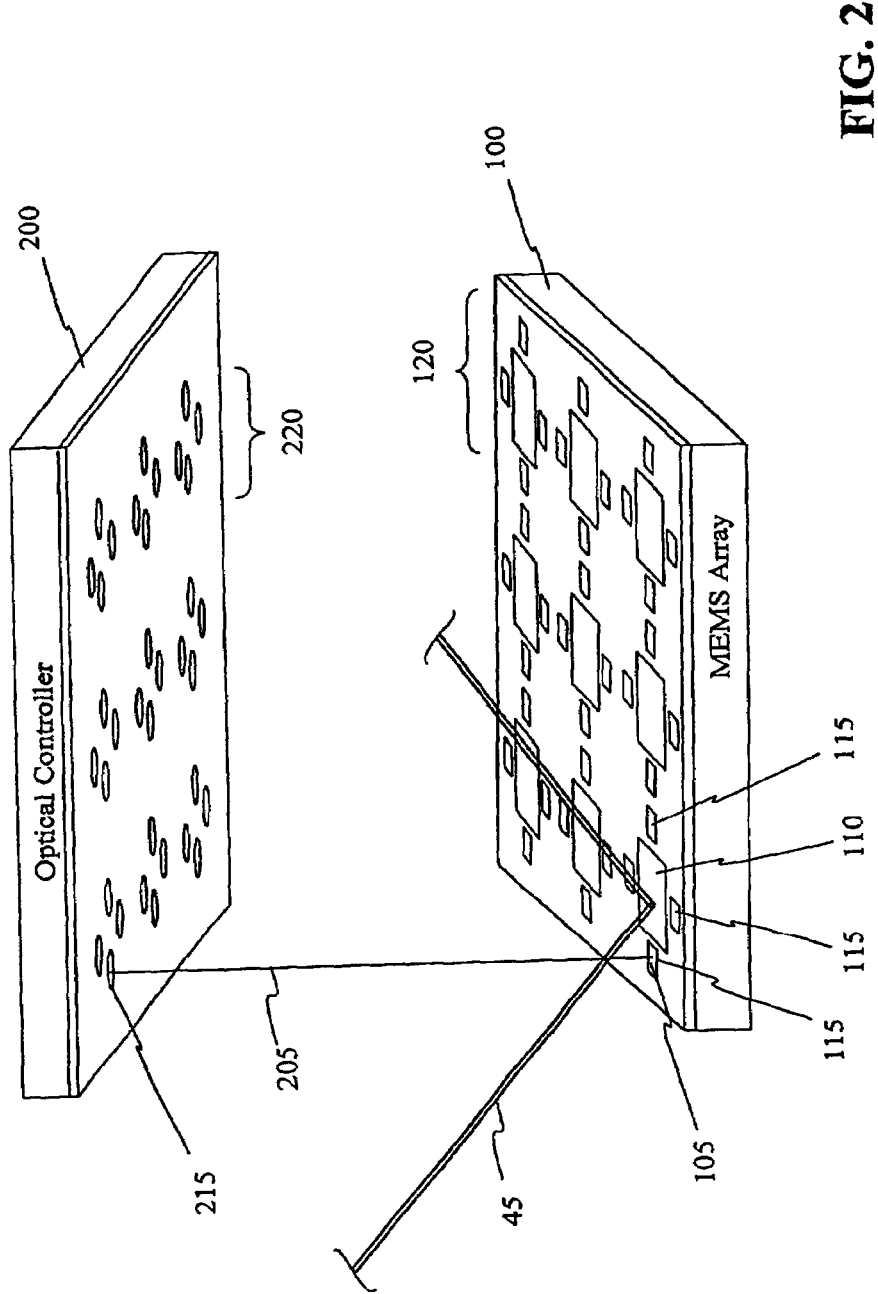
FIG. 2 is a perspective view of the optical controller and MEMS array components of the present invention.

Referring now to FIG. 2, a perspective view of an exemplary configured MEMS array 100 and optical controller 200 are shown. In this Figure, optical controller 200 is configured with a 3.times.3 array of light generating units 220, with each of the light generating units 220 comprised of four individual lenslets 215.

Similarly, MEMS array 100 is shown having a 3×3 array of mirror units 120, with each of the mirror units 120 having four sensors 115 and a mirror 110. In one embodiment, each one of the array of mirror units 120 of the MEMS array 100 corresponds to one of the array of light generating units 220 of the optical controller 200. More specifically, each sensor 115 of a particular mirror unit 120 may be associated with a particular lenslet 215 of the optical controller 200.

Control beam 205 is shown propagating through lenslet 215 and striking the sensor 115 at location 105. Also shown is a communication beam 45 striking the mirror 110. For reasons that will become clear, mirror 110 may have been positioned based on information obtained from the control beam 205 and sensor 115. Positioning the mirror 110 causes the communication beam 45 to be redirected to an appropriate location at the beam receiving element 30.

The following discussion will refer to the generation of a single control beam 205 to control a mirror unit 120 so that the redirection of a single communication beam 45 may be controlled. However, it is to be understood that any or all of the mirror units 120 of the array of mirrors may be controlled at a given time by the generation of a plurality of control beams. In this configuration, the present invention may be used to control and redirect a plurality of communication beams.

Optical Controller

Figure 3:
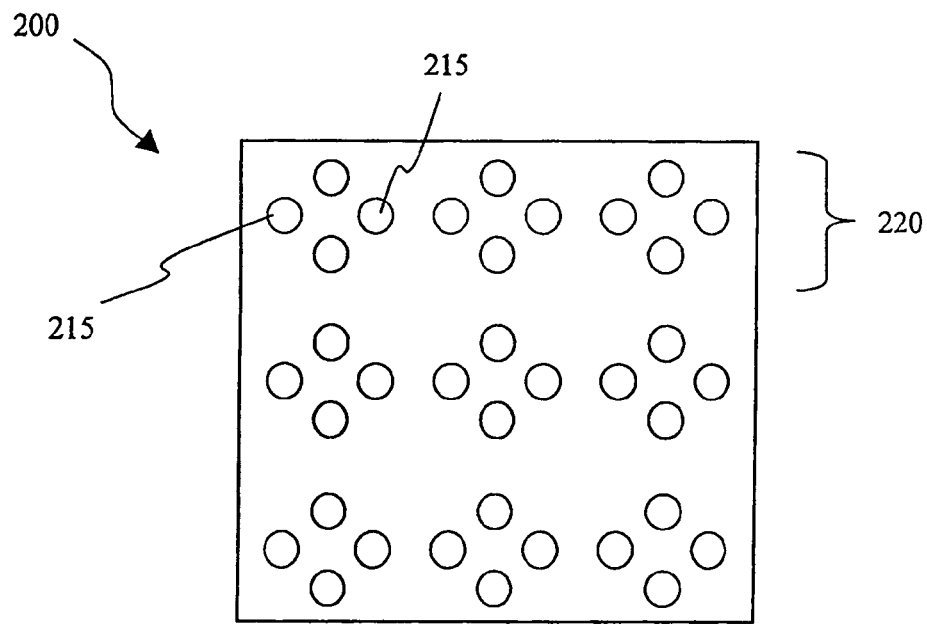
FIG. 3 is a bottom view of the optical controller component of the present invention.
Figure 4:
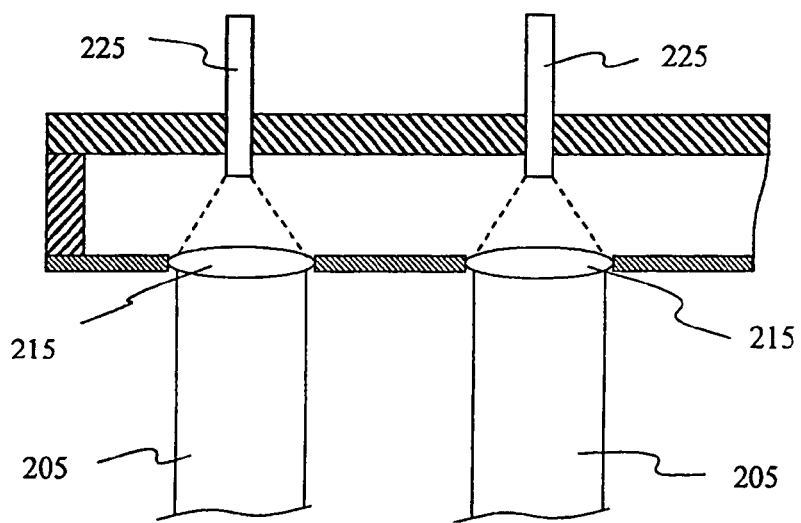
FIG. 4 is a cross-section of the optical controller component shown in FIG. 3.

Referring to FIGS. 3 and 4, a bottom view of a light generating portion of the optical controller 200, and a cross-sectional view of an individual light generating unit 220 are shown.

In FIG. 3, the optical controller 200 is configured with a 3.times.3 array of light generating units 220. In one embodiment, each of the light generating units 220 comprises four individual lenslets 215 which corresponds to the four individual sensors 115 of the mirror array 120. The optical controller 200 may be configured so that each of the lenslets 215 is provided a light source. In particular, optical controller 200 may be fabricated so that each lenslet 215 receives light from a separately controlled light source 225. In one embodiment, light may be generated at the light source 225, focused by lenslet 215, where it propagates away from the optical controller 200 as a control beam 205.

Light source 225 may include any of a variety of different light generating devices. For example, light source 225 may be a light emitting diode (LED), an optical fiber, a laser, a vertical cavity surface emitting laser (VCSEL), and the like. The optical controller 200 is shown having an array of lenslets 215 which may be particularly useful to focus some types of light sources (e.g., LED generated light); however, different configurations are possible. For example, if light source 225 generates a cylindrical light beam having a sufficiently low divergence characteristic (e.g., light generated by a VCSEL), then the lenslets 215 may not be necessary.

Optical controller 200 may also be configured with the appropriate electronics so that the optical characteristics of the various light sources 225 may be controlled. Typically, the optical controller 200 controls the light intensity and/or light wavelength of the control beam 205 produced by the light source 225.

The generated control beam 205 is not limited to a particular intensity or wavelength. However, since the present invention may be used in an optical switch where other light beams may be present, the generated control beam would optimally be generated at such a wavelength and/or intensity that it would not adversely affect the other light beams. In particular, the control beam 205 may be generated at such a wavelength so that it does not interfere with any communication beams and/or alignment beams that may also be present.

For example, some types of optical systems utilize a data carrying communication beam in the infrared spectral region (e.g., greater than about 700 nm). Other systems utilize a companion alignment beam to facilitate the positioning of the communication beam. In these systems, the alignment beam is typically generated at the near infrared or red spectral region (e.g., about 600 to 700 nm). Accordingly, the control beam generated by the present invention is typically generated at a wavelength that is different that any of the other light beams that may be present to avoid or minimize any interference. In one embodiment, the control beam 205 may be generated at the blue or ultraviolet spectral region (e.g., less than about 450 nm) so that any other light beams that may be present (e.g., a communication and/or alignment beam) are not adversely affected.

Although a variety of different light sources and configurations have been described and illustrated, it is to be understood that the present invention is not so limited. Accordingly, one of ordinary skill will realize that the optical controller 200 may be configured with any of a variety of controllable light sources and focusing optics that may be necessary to generate the control beam 205.

Exemplary MEMS Array

Figure 5:
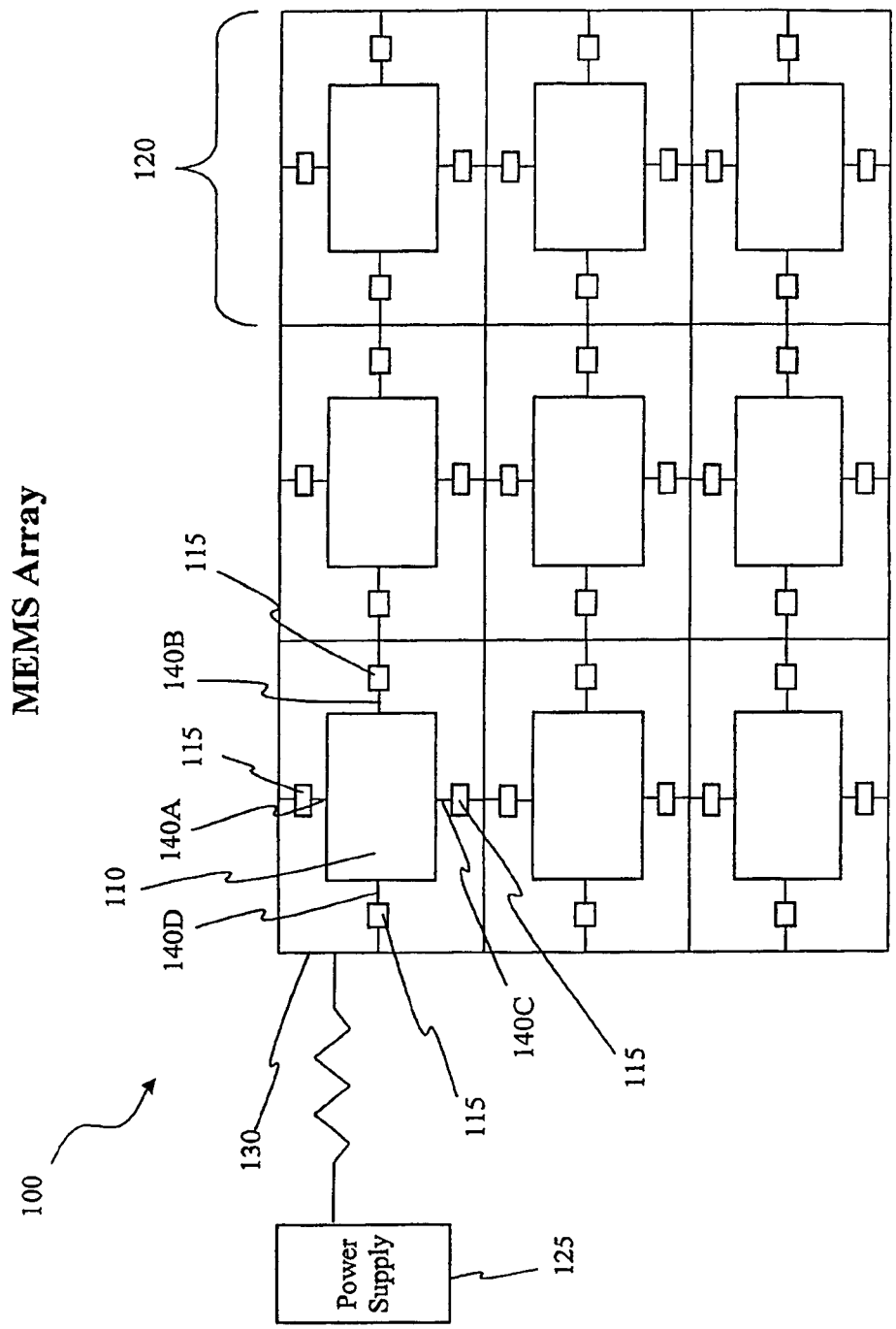
FIG. 5 is a top view of the MEMS array component of the present invention.

Referring now to FIG. 5, a top view of the MEMS array 100 is shown. This Figure shows a more detailed view of an exemplary configuration of each of the mirror units 120, as well as a typical spatial relationship between the sensors 115 and mirror 110 of each of the mirror units 120. It is to be understood that the geometry and positioning of the sensors 115 and mirrors 110 is exemplary, and that other configurations and sizes are possible.

A power supply 125 is shown supplying the necessary voltage to each of the mirror units 120. Specifically, power supply 125 is electrically connected to the MEMS array 100 via an electrical path 130, which in turn supplies power to each of the sensors 115. Each sensor 115 is shown connected to an associated mirror 110 via an electrode 140. As described in more detail with respect to FIGS. 6A-D, the mirror 110 moves in response to an electrical signal determined by sensor 115, via electrode 140. Typically, sensor 115 includes circuitry that can switch the load voltage received from the power supply 125 so that only the desired amount of voltage reaches the mirror 110.

It is particularly notable that each of the mirror units 120 may be supplied by a single external power source (power supply 125), eliminating a need for each mirror unit 120 (i.e., each sensor 115 of each mirror unit 120) to have a separate, dedicated, electrical lead. Alternatively, electrical potential may be supplied to each of a plurality of optical sensors 115 via a number of electrical leads, where the number of electrical leads is less than the number of optical sensors 115 or less than the number of mirror units 120 that form the MEMS array 100. Regardless of the configuration utilized, it is to be understood that it is not necessary (although possible) to provide each individual optical sensor 115 with a dedicated electrical lead.

Exemplary Individual Mirror Unit

Figure 6A:
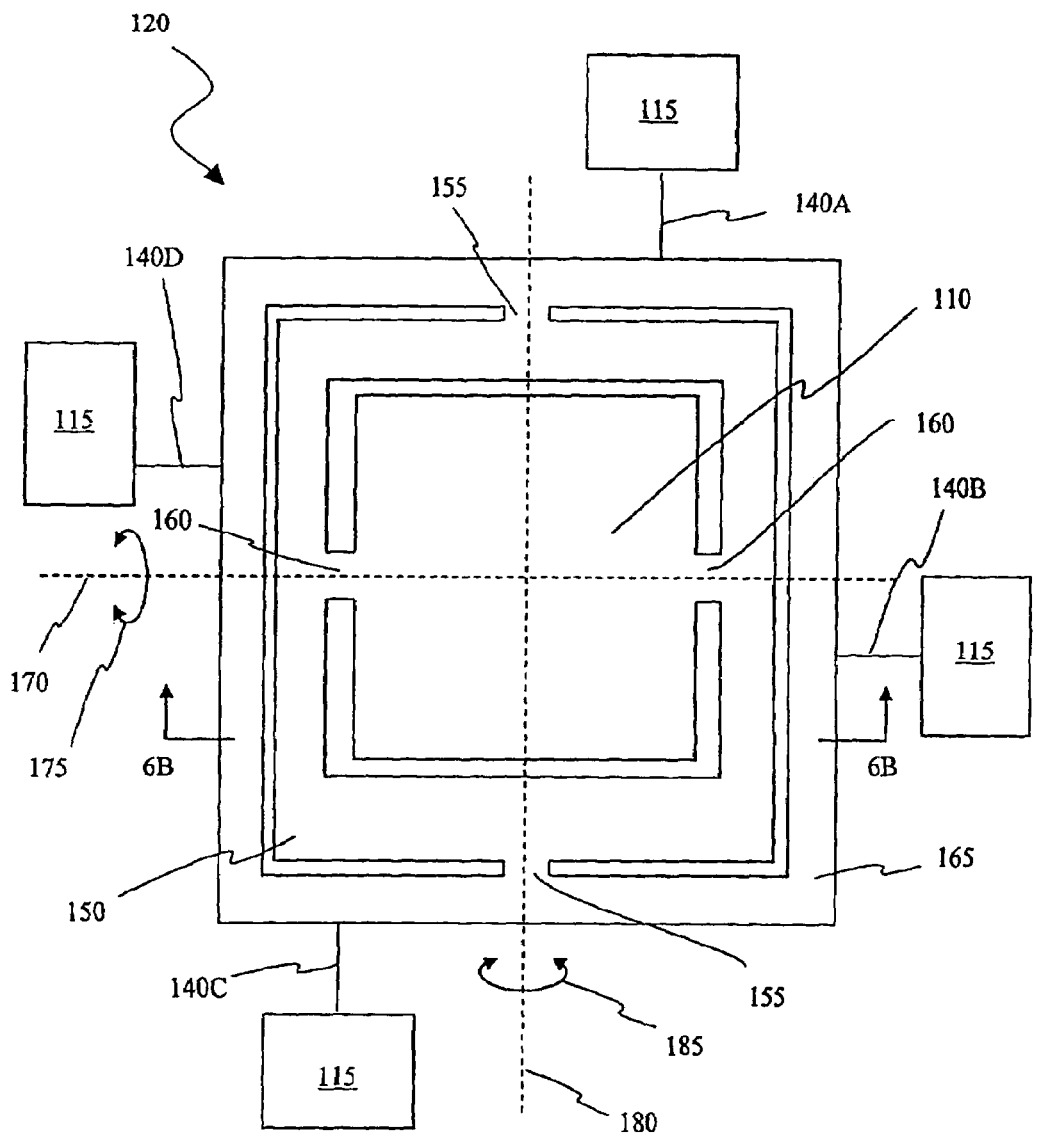
FIG. 6A is a top view of one of an array of mirror units that comprises the MEMS array component of the present invention.
Figure 6B:
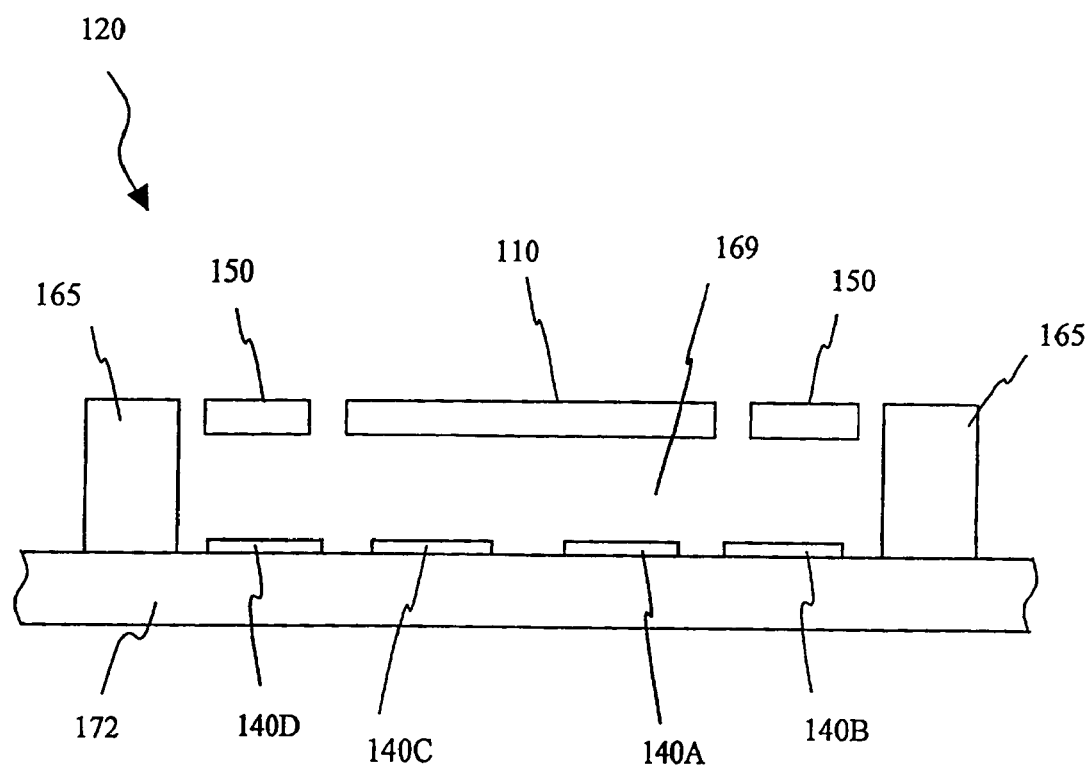
FIG. 6B is a side view of one of an array of mirror units that comprises the MEMS array component of the present invention.

Reference is now made to FIGS. 6A and 6B, which are respectively top and side views of an individual mirror unit 120. It is to be understood that each one of the 3.times.3 array of mirror units 120 may be configured similarly.

A variety of different types of MEMS devices may be used to construct the mirror unit 120 of the present invention. Appropriate types of MEMS devices include continuous or three-dimensional steering MEMS devices.

It is also to be understood that the construction of the mirror unit 120 is not limited to any particular MEMS device and any of a variety of electrically controlled reflecting devices may be used. Although reference will be made to mirror unit 120 being constructed with a MEMS device that comprises a substantially rectangular mirror surface, additional configurations (e.g., oval, circular, square, etc.) are well within the contemplation of the present invention. Additionally, reference will be made to reflective surfaces (e.g., mirror 110) that may be rotated about two substantially perpendicular axes. However, non-perpendicular axis rotation, as well mirror units having a single axis of rotation, may also be used.

The mirror unit 120 may include a mirror 110 that is connected to a supporting structure 150 (e.g., a gimbal). The supporting structure 150 may include an inner pair of torsional members 160 that couple the mirror 110 to the supporting structure 150, and an outer pair of torsional members 155 that couple the supporting structure 150 to the substrate 165. A cavity 169 underlies the mirror 110 and supporting structure 150 and provides the necessary area for the mirror 110 to rotate about one or more of its axes. The base substrate 172 includes electrodes 140A-D which are in electrical communication to their respective sensor 115. The two pairs of torsional members 155 and 160 may be positioned perpendicular to each other, providing rotation about two axes.

In one embodiment, the mirror 110 of the mirror unit 120 rotates relative to the major plane of the substrate 165 in response to an electrical signal. In particular, the application of an electrical potential to at least one electrode (e.g., electrodes 140A-D) may result in the movement of mirror 110. Movement of mirror 110 is about the axis defined by one of the pair of torsional members. As shown, mirror 110 may be moved about axis 170, in direction 175. Additionally, the mirror 110 may be moved about axis 180, in direction 185. Accordingly, by the application of the appropriate electrical signals, the mirror 110 may be moved about an individual axis, or along both axes as may be desired.

The degree of rotation about axes 170 and 180 typically depend on the magnitude of the electrical potential that is applied to the appropriate electrode. In one embodiment, mirror unit 120 may be configured so that the mirror 110 may be rotated or tilted out of plane anywhere from about −40 degrees to about 40 degrees. However, an out of plane rotation in the range of about −20 degrees to about 20 degrees is sufficient for most applications.

Mirror rotation may be controlled by deflecting either the mirror 110 and/or the supporting structure 150 towards one or more of the electrodes 140A-D. The deflection may be controlled by adjusting the electrical potential applied between the mirror 110 and one or more of the electrodes 140A-D, and/or the supporting structure 150 and one or more of the electrodes 140A-D.

The degree of rotation for the mirror 110 and/or the supporting structure 150 may depend on the size and polarity of the potential difference established between the mirror 110, the supporting structure 150, and one or more electrodes 140A-D. For example, potential differences in the range of about 0 volts to about 300 volts may generate angles of rotation of about 0 degrees to about 30 degrees.

In the present invention, the direction and axis that the mirror 110 is rotated may depend on which particular electrode is supplied voltage. For example, the mirror unit 120 may be configured with four electrodes, electrodes 140A-D, which are in electrical communication with an associated sensor 115. Applying voltage across electrode 140A may result in mirror 110 rotating about axis 170. Similarly, the application of voltage across electrode 140C may result in mirror 110 rotating about axis 170, but in an opposite direction than when voltage is supplied to electrode 140A. Likewise, mirror 110 may be rotated about axis 180 by applying voltage across electrode 140B or 140C. Accordingly, it is to be understood that the direction, magnitude, and axis that mirror 110 is rotated may be controlled by controlling the amount of voltage applied to one or more of the electrodes 140A-D.

Each electrode 140A-D is configured with a sensor 115 which may be used to control the amount of voltage supplied to an associated electrode. As previously noted, the load voltage may be supplied to each sensor 115 via a common electrical connection 130, eliminating the need for each sensor 115 to have its own dedicated electrical lead. Sensor 115 may include a light sensing device, such as a photodiode or photoconductor, as well as be configured with the necessary bias circuitry (not shown in this Figure) to produce a variable output voltage, for example.

In one embodiment, light (e.g., control beam 205) received by sensor 115 and associated bias circuitry may control the amount of voltage that is supplied to a particular electrode (e.g., electrodes 140A-D). That is, the sensor 115 controls the amount of voltage from electrical connection 130 that reaches a particular electrode. The sensor 115 may be configured so that the voltage supplied to an associated electrode changes in response to the optical characteristics of the light beam that strikes the sensor 115. Sensor 115 may provide, for example, any of a range of voltages based on the intensity of the control beam 205. Sensor 115 may also associate a particular wavelength of the control beam 205 with a particular voltage. In this configuration, the voltage generated by sensor 115 may be controlled by modifying the wavelength and/or the intensity of the control beam 205.

Figure 6C:
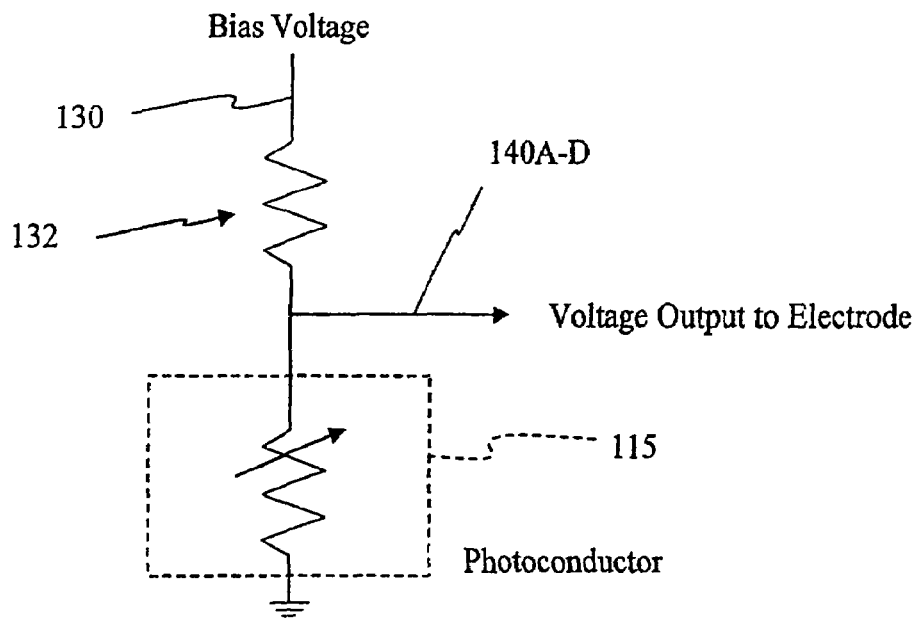
FIGS. 6C-D are diagrams showing exemplary sensor voltage circuitry configurations using photoconductor and photodiode sensors.
Figure 6D:
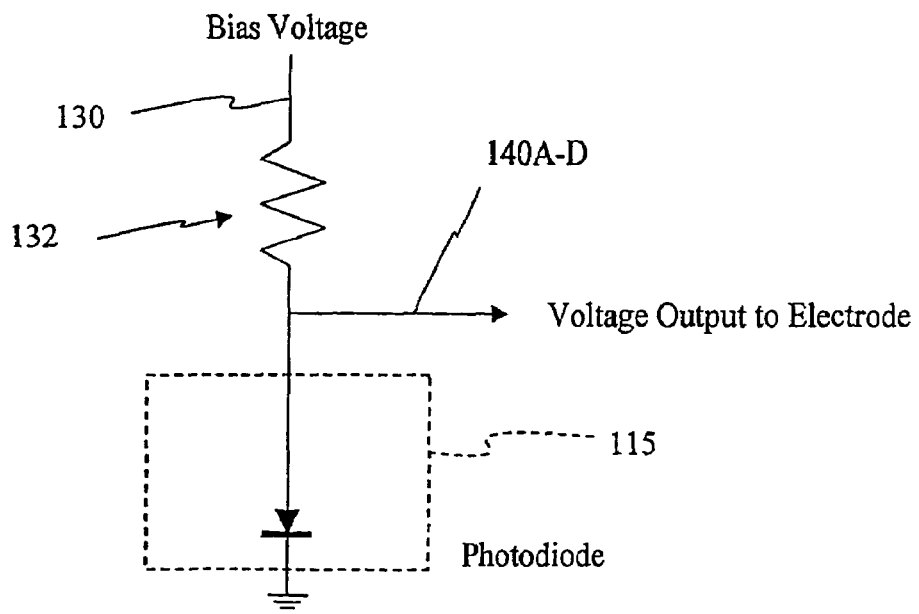

FIGS. 6C and 6D are two examples of how sensor 115 may be configured with appropriate bias circuitry to control the amount of voltage that is supplied to a particular electrode (e.g., electrodes 140A-D). In particular FIG. 6C shows the use of a photodiode as the light sensing sensor 115, and FIG. 6D shows the use of a photoconductor for sensor 115.

Typically, the photodiode or photoconductor both require a bias voltage in series with a resistor 132 to generate a variable voltage. As the light level increases, for example, the current through the photodiode or photoconductor changes, resulting in a change in the voltage across the bias resistor, and thus a change in the voltage output to the electrode (e.g., electrodes 140A-D). The output voltage may range from 0 volts to the bias voltage of the electrical lead 130. If the bottom voltage in the illustrated circuits is connected to a negative voltage, then the output voltage may also go negative. The change in the light level, for example, may be accomplished by changing the light level directly, or by modulating the light level, or by changing the wavelength. To increase the change as the light wavelength is changed, an optical coating may be applied to the photodiode or photoconductor, which has a variable transmission dependent on wavelength.

Accordingly, by modifying or controlling the optical characteristics (e.g., optical wavelength, light intensity, position, polarization, duty cycle, etc.) of the control beam 205, the amount of voltage that reaches a particular electrode 140A-D of a mirror unit 120 may therefore be controlled. As described above, the amount of voltage applied to one or more of the electrodes 140A-D may be used to control the movement of mirror 110. Thus, by modifying the optical characteristics of the control beam 205 that strikes the sensor 115 (e.g., controlling the intensity and/or wavelength) the direction, magnitude, and axis that mirror 110 is rotated can also be controlled.

Operation of an Optically Addressed MEMS

Figure 7:
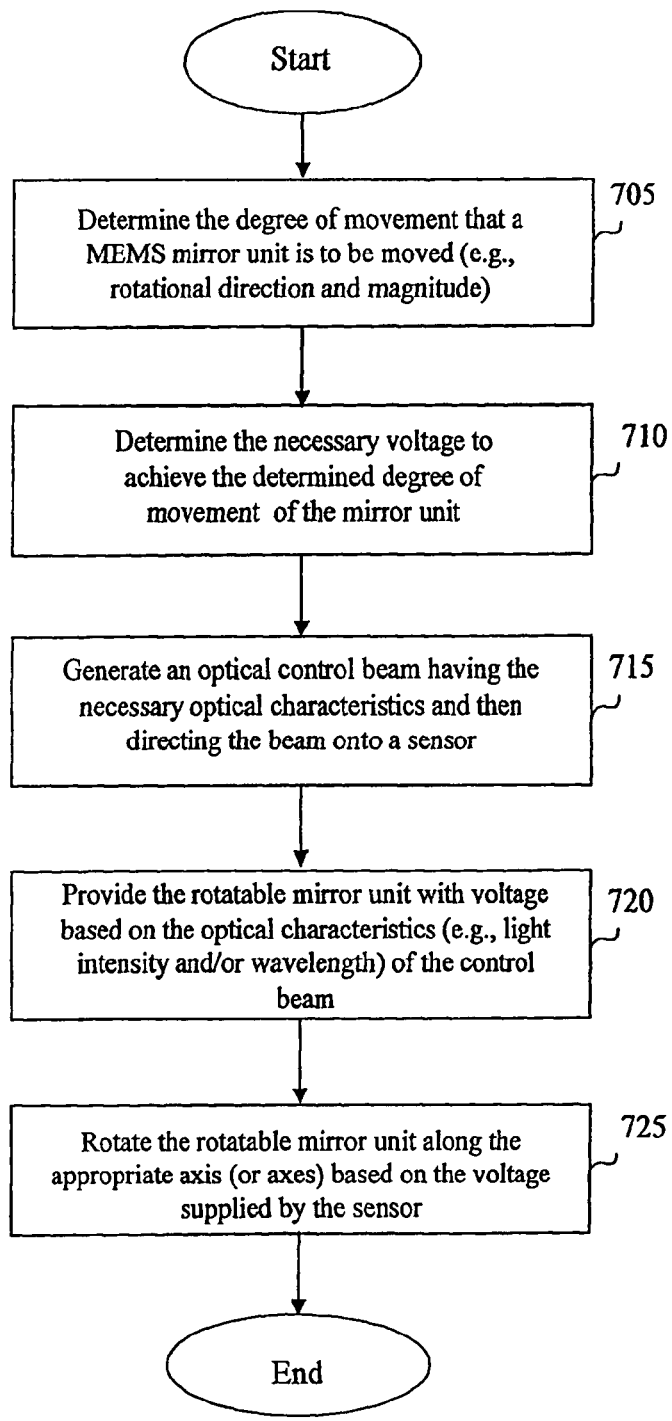
FIG. 7 is a flowchart illustrating some of the operations that an optical switch utilizing the optically addressed MEMS of the present invention may perform to switch an optical signal.

To illustrate some of the capabilities of the optically addressed MEMS of the present invention, the switching of an optical signal will now be described with respect to FIGS. 1, 2, and 7.

In one embodiment, beam generating element 15 generates a communication beam 45 which propagates over a distance until it impinges upon a mirror 110 of mirror unit 120. The communication beam 45 is then redirected based on the current positioning of the mirror 110. The redirected communication beam 45 then continues until it reaches the appropriate portion of the beam receiving element 30.

At some point, it may be necessary to switch the location where the communication beam 45 is redirected (e.g., switch the beam to a different output fiber). One method for redirecting the communication beam 45 is to modify the positioning of the mirror unit 120. More particularly, beam redirection may be accomplished by rotating mirror 110 about one or more axes in such a manner that a reflected communication beam 45 is directed to a desired location (e.g., an output fiber) on the beam receiving element 30. Positioning of the rotating mirror 110 may proceed as follows.

Once the destination location that the communication beam 45 is to be directed has been determined, calculations may be performed to determine, for example, the rotational direction and magnitude mirror 110 is to be moved (operation 705).

The voltage that is necessary to achieve the proper positioning of the mirror 110 may also be determined (operation 710). Once the voltage values have been determined, a light beam (i.e., control beam 205) having the appropriate optical characteristics may then be generated (operation 715). Again, the control beam 205 will typically be generated at a particular intensity and/or wavelength so that the desired voltage may be generated at the appropriate sensor 115. At this point, the generated control beam 205 propagates away from the optical controller 200 until it strikes a sensor 115 on the MEMS array 100.

Sensor 115 may sample the control beam 205 and determine, for example, the wavelength and/or intensity of the control beam 205. As described above, the sensor 115 may utilize the optical characteristics of the control beam 205 as a basis for supplying the necessary voltage to an associated electrode (e.g., electrodes 140A-D), and ultimately to mirror 110 (operation 720).

Sensor 115 then may supply the mirror 110 with voltage, via an associated electrode, causing the mirror 110 to rotate about the appropriate axis (or axes) (operation 725).

Because of the above-described repositioning of the mirror 110, any communication beams 45 that may now strike the mirror 110 will be redirected to a desired location on the beam receiving element 30. The mirror 110 may remain at the repositioned location until a change in the intensity and/or wavelength of control beam 205 is detected.

Typically, the control beam 205 is generated on a continual basis to drive the sensor 115, associated electrode, and the mirror 110. However, additional implementations are possible and fully contemplated by the present invention. For example, some types of MEMS devices employ ratcheting mechanisms that permit the reflecting mirror to remain in a particular position, even in the absence of applied voltage. When these types of devices are utilized, the control beam 205 may be generated only when a change in position of the mirror 110 is desired.

Multiple Optically Addressed MEMS Array System (with Reflector)

Figure 8:
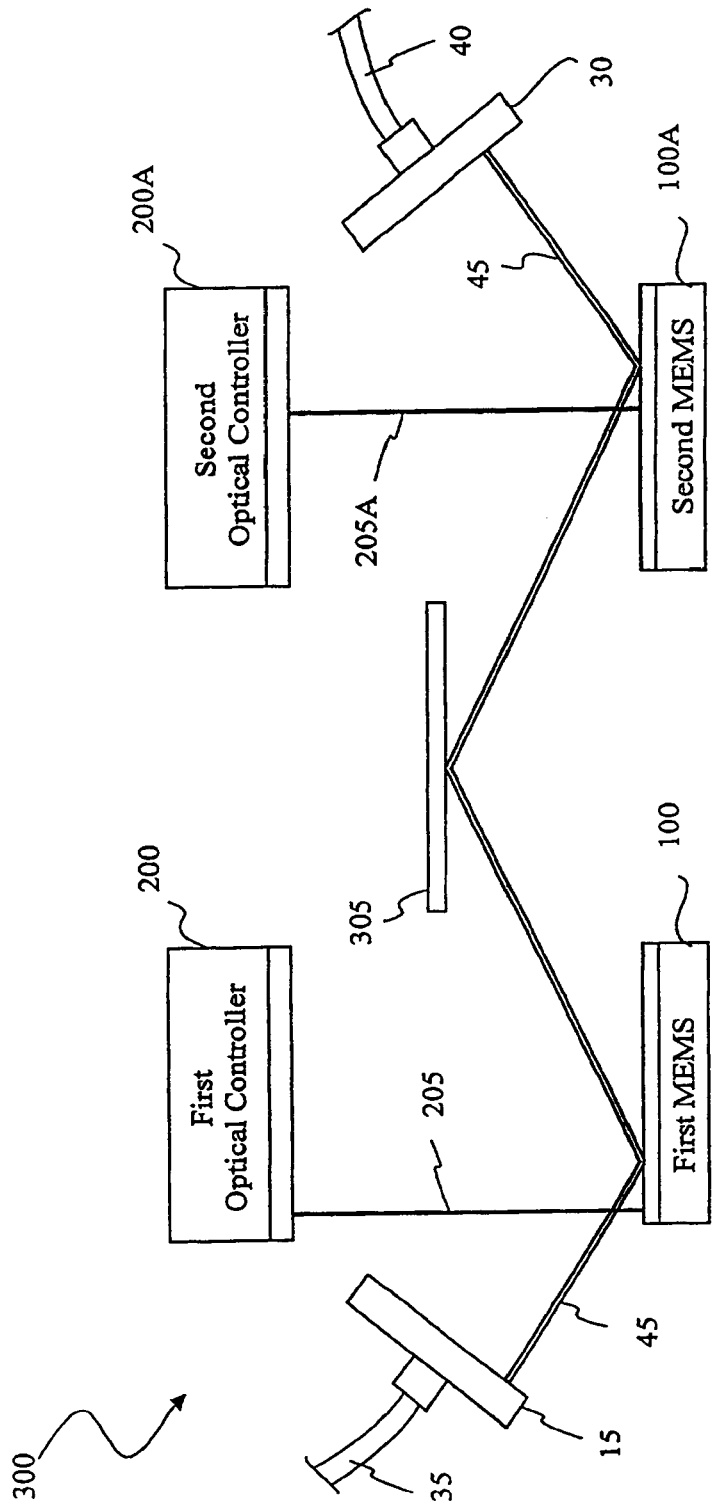
FIG. 8 is a diagram of an alternative configuration of an optical switch utilizing a reflector and two optically addressed MEMS of the present invention.

Referring now to FIG. 8, a diagrammatic representation of another embodiment of an optical switch that may utilize two optically addressed MEMS arrays is shown and generally designated 300. Switch 300 may be configured similarly to the switch illustrated in FIG. 1. However, in contrast to the switch in FIG. 1, switch 300 includes a second optical controller 200A, an associated second MEMS array 100A, as well as a reflector 305. Typically, optical controller 200A and second MEMS array 100A are configured in a manner similarly to the optical controller 200 and MEMS array 100, respectively.

In operation, beam generator 15 generates a communication beam 45 which may propagate over a distance until it impinges upon a mirror 110 of mirror unit 120. Similarly to the communication beam 45 shown in FIG. 1, the communication beam 45 in this embodiment is redirected based on the current positioning of the mirror 110. However, in contrast to the switch shown in FIG. 1, the communication beam 45 in switch 300 strikes the reflector 305 where it is then redirected to the second MEMS array 100A. The communication beam 45 continues until it strikes a mirror 110 located in a mirror unit 120 of the second MEMS array 100A. The communication beam is again redirected so that it will strike the appropriate portion of the beam receiving element 30.

Redirecting the communication beam 45 may be performed in a manner similar to the switch in FIG. 1. For example, the respective mirrors 110 of the MEMS arrays 100 and 100A may be rotated about one or more axes in such a manner that a reflected communication beam 45 is directed to a desired location (e.g., an output fiber) on the beam receiving element 30. However, in this embodiment, the calculations will typically consider the second MEMS array 100A as well as the reflector 305.

Multiple Optically Addressed MEMS Array System (No Reflector)

Figure 9:
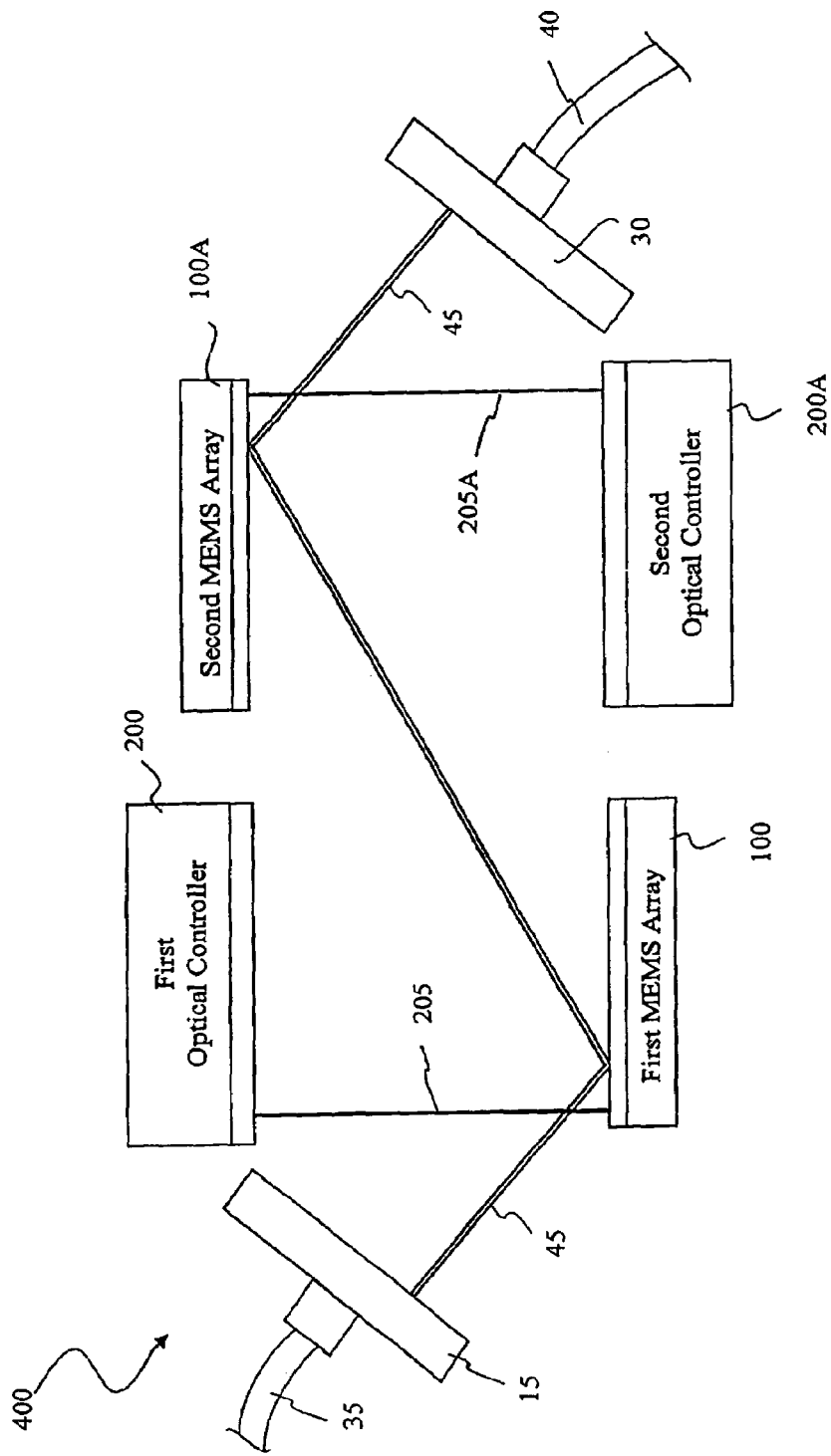
FIG. 9 is a diagram of another alternative configuration of an optical switch utilizing two optically addressed MEMS of the present invention.

Referring now to FIG. 9, a diagrammatic representation of another embodiment of an optical switch that may utilize two optically addressed MEMS arrays are shown and generally designated 400. Switch 400 may be configured similarly to the switch illustrated in FIG. 8. However, in contrast to the switch in FIG. 8, switch 400 does not require a reflector and instead utilizes an inverted optical controller 200A and associated second MEMS array 100A configuration. Again, as with the switch in FIG. 8, optical controller 200A and second MEMS array 100A may be configured in a manner similarly to the optical controller 200 and MEMS array 100, respectively.

In operation, beam generator 15 generates a communication beam 45 which propagates over a distance until it impinges upon a mirror 110 of mirror unit 120. Similarly to the communication beam 45 shown in FIG. 8, the communication beam 45 is reflected and redirected based on the current positioning of the mirror 110. However, in contrast to the switch shown in FIG. 8, the communication beam 45 in switch 400 may be directed to the second MEMS array 100A without first being reflected from a reflector. The communication beam 45 may then strike a mirror 110 located in a mirror unit 120 of the second MEMS array 100A. Again, the communication beam 45 may be redirected so that it will strike the appropriate portion of the beam receiving element 30.

Redirecting the communication beam 45 may be performed in a manner similar to the switch in FIG. 8. However, in this embodiment, the various calculations that may be performed will consider the inverted second MEMS array 100A and second optical controller 200A combination, but will not have to consider a reflector.

Multi-Beam Optical Switch

Figure 10:
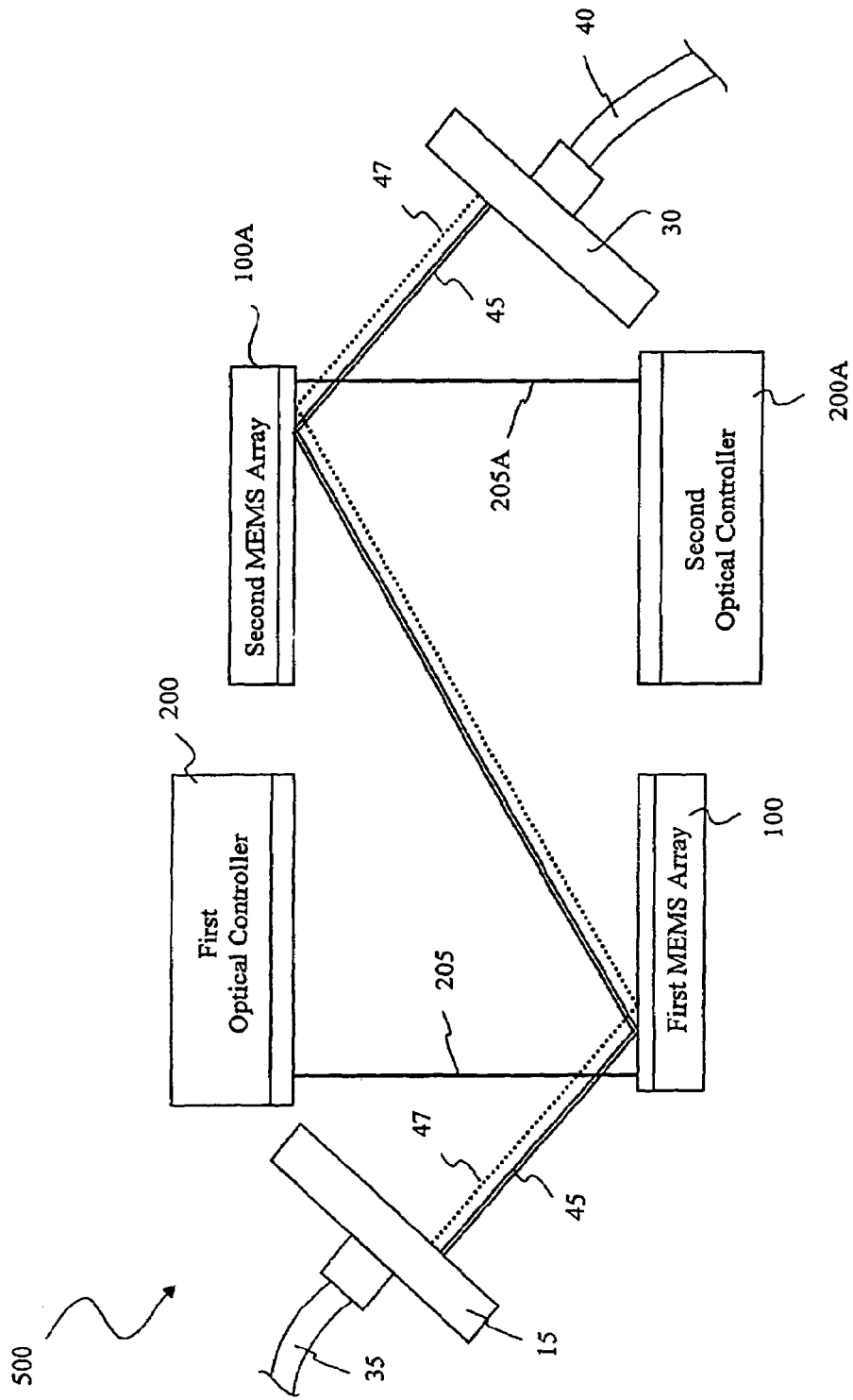
FIG. 10 is a diagram of still another alternative configuration of an optical switch utilizing an alignment beam and two optically addressed MEMS of the present invention.

Referring now to FIG. 10, an exemplary configuration of another embodiment of the present invention is shown and generally designated 500. In this Figure, switch 500 may be configured similarly to the switch illustrated in FIG. 9. However, in contrast to the switch in FIG. 9, switch 500 may be configured so that it accommodates for the transmission of multiple optical beams. In particular, switch 500 may be configured to provide switching for the communication beam 45 in the presence of an alignment beam 116.

Again, as with the switch in FIGS. 8 and 9, optical controller 200A and second MEMS array 100A may be configured in a manner similarly to the optical controller 200 and MEMS array 100, respectively.

In operation, beam generating element 15 generates a communication beam 45 and an alignment beam 47 which propagate towards the first MEMS array 110 where they impinge upon a mirror 110 of mirror unit 120. The communication beam 45 and alignment beam 47 may then be redirected based on the current positioning of the mirror 110. An example of the communication beam 45 and alignment beam 47 being redirected by the mirror 110 is shown in FIG. 11.

The redirected beams 45 and 47 may continue to propagate until they strike a mirror 110 located in a mirror unit 120 of the second MEMS array 100A. The beams 45 and 47 may again be redirected so that they propagate away from the second MEMS array 100A until they strike an appropriate portion of the beam receiving element 30. Redirecting the communication beam 45 at the first and second MEMS arrays 100 and 100A may be performed in a manner similar to that which was described in FIG. 9.

While there have been shown what are presently considered to be preferred embodiments of the present invention, it will be apparent to those skilled in the art that various changes and modifications can be made herein without departing from the scope and spirit of the invention.

What is claimed is:

1. A method for controlling a micro-electromechanical system (MEMS), said method comprising:
providing a rotatable mirror with an optical sensor that is in electrical communication with said rotatable mirror via an associated electrode;
supplying electrical potential to said optical sensor, wherein said optical sensor is configured to provide a variable range of voltages to said rotatable mirror;
directing an optical control beam onto said optical sensor, wherein said optical sensor determines optical characteristics of said optical control beam;
responsively supplying voltage to said rotatable mirror, wherein an amount of said supplied voltage is based on the determined optical characteristics of said optical control beam; and
rotating said rotatable mirror about a primary axis in response to said supplied voltage to said rotatable mirror.

2. The method according to claim 1, said method further comprising: controlling an angle of rotation of said rotatable mirror about said primary axis by modifying the optical characteristics of said optical control beam.

3. The method according to claim 1, said method further comprising: controlling an angle of rotation of said rotatable mirror about said primary axis by modifying an optical wavelength of said optical control beam.

4. The method according to claim 1, said method further comprising: controlling an angle of rotation of said rotatable mirror about said primary axis by modifying a light intensity of said optical control beam.

5. The method according to claim 1, said method further comprising:
providing said rotatable mirror with a plurality of optical sensors that are in electrical communication with said rotatable mirror via separate electrodes, wherein a first and second optical sensor, of said plurality of optical sensors, are associated with rotating said rotatable mirror about respective primary and secondary axes;
supplying electrical potential to each of said plurality of optical sensors, wherein each of said plurality of optical sensors are configured to provide a variable range of voltages to said rotatable mirror;
directing a first optical control beam onto said first optical sensor, and directing a second optical control beam onto said second optical sensor, wherein said first and second optical sensors respectively determine optical characteristics of said first and second optical control beams;
responsively supplying voltage to said rotatable mirror, wherein an amount of said supplied voltage is based on the respectively determined optical characteristics of said first and second optical control beams; and
rotating said rotatable mirror about said primary and secondary axes in response to voltage respectively supplied by said first and second optical sensors.

6. The method according to claim 5, said method further comprising:
controlling respective angles of rotation of said rotatable mirror about said primary and secondary axes by modifying the respective optical characteristics of said first and second optical control beams.

7. The method according to claim 5, wherein said primary and secondary axes are perpendicular.

8. The method according to claim 1, wherein said micro-electromechanical system (MEMS) is used in an optical cross connect switch.

9. The method according to claim 1, wherein said optical control beam is generated by a light source selected from the group consisting of a light emitting diode (LED), an optical fiber, a laser, and a vertical cavity surface emitting laser (VCSEL).

10. The method according to claim 1, said method further comprising:
controlling an angle of rotation of said rotatable mirror about said primary axis by modifying at least one optical characteristic of said optical control beam, wherein said at least one optical characteristic is selected from the group consisting of optical wavelength, light intensity, position, polarization, and duty cycle.

11. An optically controlled micro-electromechanical system (MEMS), said MEMS comprising:

a rotatable mirror having an optical sensor that is in electrical communication with said rotatable mirror via an associated electrode;

an electrical lead that supplies electrical potential to said optical sensor;

an optical controller for directing an optical control beam onto said optical sensor, wherein said optical sensor determines optical characteristics of said optical control beam; and a power supply that is configured with said optical sensor, wherein said power supply responsively supplies voltage to said rotatable mirror based on the determined optical characteristics of said optical control beam, causing said rotatable mirror to rotate about out a primary axis in response to voltage supplied by said voltage controller.

12. The micro-electromechanical system (MEMS) according to claim 11, wherein said optical controller modifies the optical characteristics of said optical control beam to control an angle of rotation of said rotatable mirror about said primary axis.

13. The micro-electromechanical system (MEMS) according to claim 11, wherein said optical controller modifies an optical wavelength of said optical control beam to control an angle of rotation of said rotatable mirror about said primary axis.

14. The micro-electromechanical system (MEMS) according to claim 11, wherein said optical controller modifies a light intensity of said optical control beam to control an angle of rotation of said rotatable mirror about said primary axis.

15. The micro-electromechanical system (MEMS) according to claim 11, wherein said optical control beam is generated by a light source selected from the group consisting of a light emitting diode (LED), an optical fiber, a laser, and a vertical cavity surface emitting laser (VCSEL).

16. The micro-electromechanical system (MEMS) according to claim 11, wherein said optical controller modifies at least one optical characteristic of said optical control beam to control an angle of rotation of said rotatable mirror about said primary axis, wherein said at least one optical characteristic is selected from the group consisting of optical wavelength, light intensity, position, polarization, and duty cycle.

17. An optical cross connect switch utilizing an optically controlled micro-electromechanical system (MEMS), said switch comprising:

a fiber optic switch beam generating element that generates a communication light beam;

a fiber optic switch beam receiving element that receives said communication light beam from said fiber optic switch beam generating element at one of an array of output fibers;

a MEMS device for directing said communication light beam from said fiber optic switch beam generating element to a particular output fiber of said beam receiving element, wherein said MEMS device comprises:

a rotatable mirror having an optical sensor that is in electrical communication with said rotatable mirror via an associated electrode;

an electrical lead that supplies electrical potential to said optical sensor;

an optical controller for directing an optical control beam onto said optical sensor, wherein said optical sensor determines optical characteristics of said optical control beam; and a power supply that is configured with said optical sensor, wherein said power supply responsively supplies voltage to said rotatable mirror based on the determined optical characteristics of said optical control beam, causing said rotatable mirror to rotate about out a primary axis in response to said supplied voltage;

wherein said optical controller controls which particular output fiber that said communication beam is directed by modifying the optical characteristics of said optical control beam.

\* \* \* \* \*